Dec. 20, 1960 E. C. MONTGOMERY ET AL 2,964,878
APPARATUS FOR FORMING OPENINGS IN MULTIPLE SHEET GLAZING UNITS
Filed May 4, 1955 2 Sheets-Sheet 1

INVENTORS
Eldwin C. Montgomery, Harry N. Dean
BY and Charles H. Cowley
Nobbe & Swope
ATTORNEYS Dec. 20, 1960   E. C. MONTGOMERY ET AL   2,964,878
APPARATUS FOR FORMING OPENINGS IN MULTIPLE SHEET GLAZING UNITS
Filed May 4, 1955
2 Sheets-Sheet 2

INVENTORS
Edwin C. Montgomery, Harry N. Dean
BY and Charles H. Cowley
Nobbe & Swope
ATTORNEYS United States Patent Office 2,964,878
Patented Dec. 20, 1960

2,964,878

APPARATUS FOR FORMING OPENINGS IN MULTIPLE SHEET GLAZING UNITS

Eldwin C. Montgomery, Toledo, Harry N. Dean, Waterville, and Charles H. Cowley, Toledo, Ohio, assignors to Libbey-Owens-Ford Glass Company, Toledo, Ohio, a corporation of Ohio Filed May 4, 1955, Ser. No. 505,922

4 Claims. (Cl. 49—1)

This invention relates broadly to all-glass multiple sheet glazing units and more particularly it relates to apparatus for forming dehydration or breather holes in such multiple sheet glazing units.

Multiple sheet glazing units may be described generally as comprising two or more sheets of glass which are sealed entirely around their edge portions in spaced relation to provide a hermetically sealed dead air space therebetween. Due principally to their insulating and condensation preventing qualities, such units have become well established in the building trades and have found wide usage as windows for buildings, show cases, vehicles, refrigerators, and the like.

In order to provide a multiple sheet glazing unit with the desired heat insulating and condensation preventing qualities, it is necessary that humid or moisture laden air be removed from the space between the sheets of glass making up the unit. This may be done by partial evacuation or by replacing the moisture laden air with dry air or gas which is best suited to the conditions to which the unit is to be put. To make possible the removal of moisture from the enclosed space between the sheets, with or without substituting dry air or gas therefor, after the sheets have been joined at the marginal edges to enclose the space, a means of access to the space must be provided in the hermetically sealed unit. Likewise, after the space has been properly dehydrated the means of access must be permanently sealed to hermetically seal the unit.

The conventional way of providing access to the enclosed space between the sheets of glazing units of this character, is to drill or otherwise cut an opening through one of the sheets before they are sealed together so that the internal and external pressures may be equalized while the edge portions of the sheets are being fused together. However, drilled holes of this type have several disadvantages in that the glass oftentimes breaks when drilled, or small fissures are produced around the hole in drilling which cause the sheet to break when exposed to thermal shock. Additionally, when the holes are drilled through the face surfaces of the glass sheets, the sealed hole is, in many cases, exposed after the unit has been glazed leaving it vulnerable to sharp instruments such as a glazer's putty knife, etc.

It is therefore a primary object of this invention to provide an all-glass multiple sheet glazing unit in which a dehydration hole or breather hole is provided along the sealed edge wall of the unit.

Another object of the invention is to provide a relatively simple, inexpensive apparatus for forming dehydration or breather holes in all-glass multiple sheet glazing units.

Another object of the invention is to provide an apparatus for forming dehydration or breather holes in the sealed edge portions of all-glass multiple sheet glazing units during the sealing of the sheets together.

A further object of the invention is to provide an apparatus for forming dehydration or breather holes in the edge portions of all-glass multiple sheet glazing units while the sheets are being moved relative to a heat source to fuse them together.

A still further object of the invention is to provide an apparatus for forming dehydration or breather holes in the edge wall portions of all-glass multiple sheet glazing units as said edge walls are being formed.

Other objects and advantages of the invention will become more apparent during the course of the following description when taken in connection with the accompanying drawings.

In the drawings, wherein like numerals are employed to designate like parts throughout the same:

While the present invention is not necessarily limited to the formation of dehydration or breather holes in multiple sheet glazing units in conjunction with any particular fabricating apparatus or according to any particular method, it has particular utility when used with the apparatus for forming multiple sheet glazing units described in copending application Serial No. 464,012, filed October 22, 1954, in the names of Eldwin C. Montgomery, Harry N. Dean, Eugene W. Babcock, and Donald E. Sharp which has been abandoned and a continuation-in-part thereof, Serial No. 735,094, filed May 12, 1958, and will be described in that connection here.

Figures 1, 2, 3, 4:
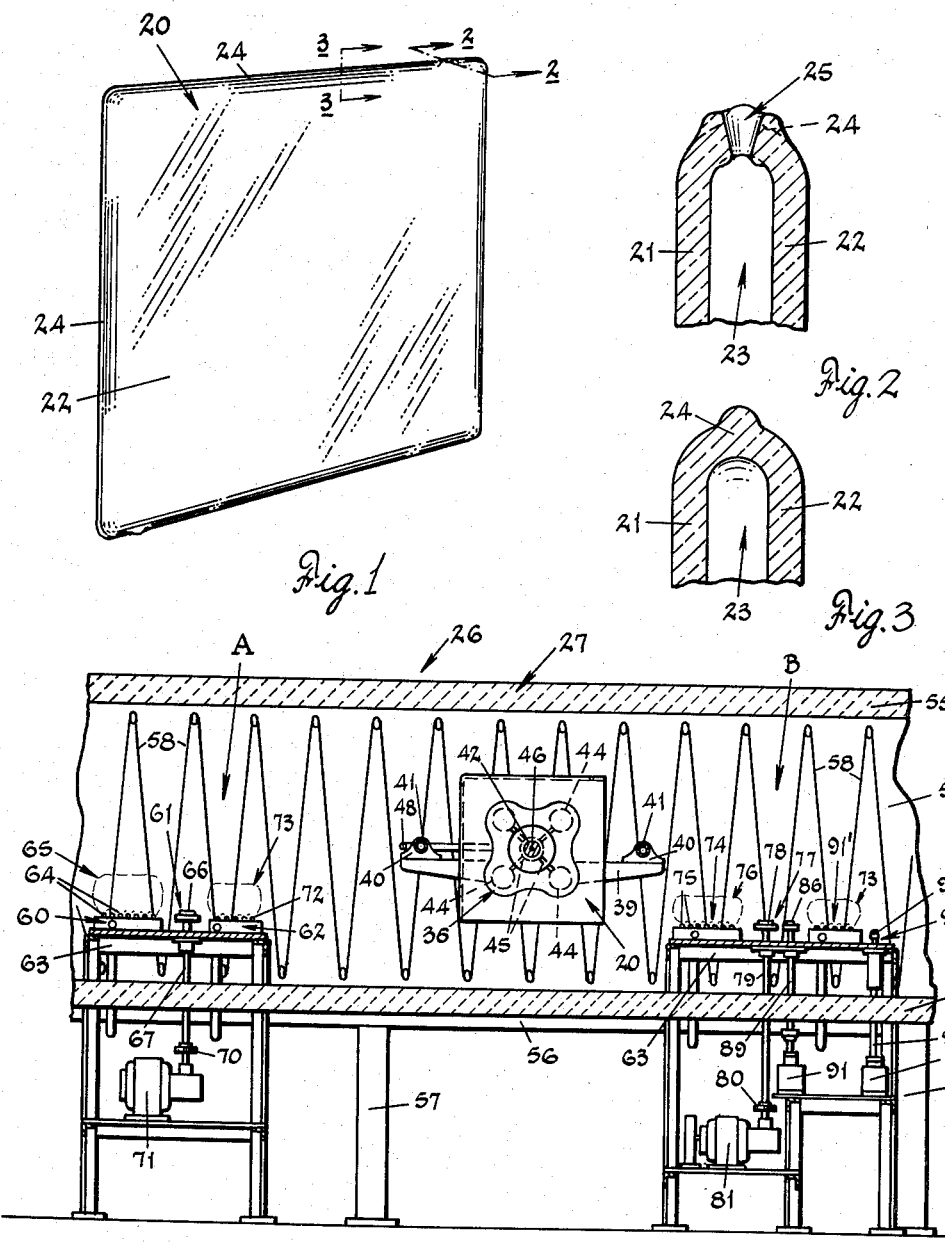
Fig. 1 is a perspective view of an all-glass multiple sheet glazing unit of the type with which this invention is concerned.
Fig. 2 is a sectional view of the glazing unit taken substantially along lines 2—2 of Fig. 1 showing a dehydration or breather hole in the sealed edge wall of the unit.
Fig. 3 is a sectional view of the sealed edge of the multiple sheet glazing unit taken substantially along lines 3—3 of Fig. 1.
Fig. 4 is a fragmentary sectional view of apparatus for producing all-glass glazing units according to this invention.

With reference now to the drawings, there is shown in Figs. 1 and 2 an all-glass glazing unit 20 produced in accordance with this invention which comprises two sheets of glass 21 and 22 spaced from one another as at 23 by edge wall portions 24. As shown in Fig. 2, a dehydration or breather hole 25 to which this invention is concerned is disposed in at least one of the edge wall portions 24. It is through dehydration or breather holes of this type that pressures within the space 23 are equalized with respect to the external pressure on the outside of the unit during and after the sheets are fused together. Also, it is through the dehydration hole that the dehydrated air is introduced into the unit.

Figure 5:
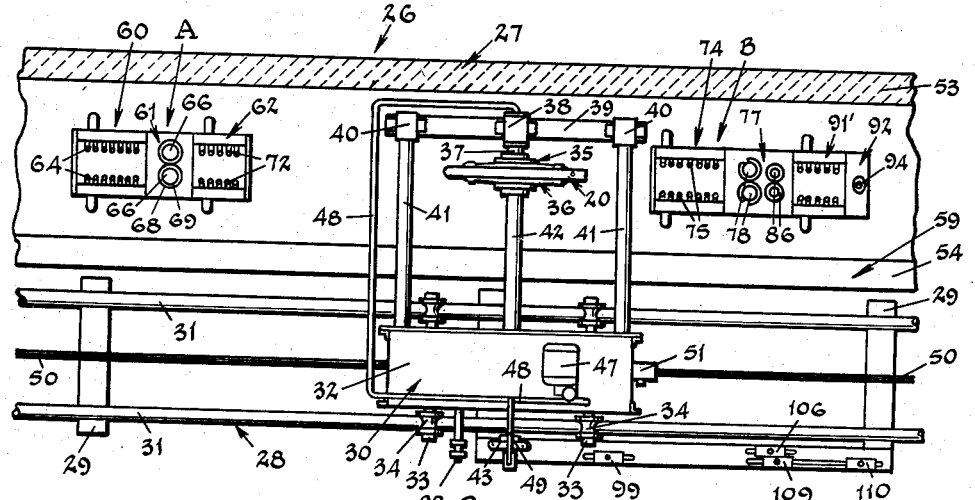
Fig. 5 is a fragmentary sectional plan view of the apparatus showing the conveyor apparatus in relation to the fusing burners and dehydration hole forming means.

As will best be seen in Figs. 4 and 5, the means by which the all-glass multiple sheet glazing unit 20 may be produced is designated generally by the numeral 26 and includes a furnace 27, and a conveyor means 28 mounted adjacent the furnace for carrying the sheets through the furnace to be fused. Within the furnace there are arranged a plurality of sealing areas here designated by the letters A and B respectively through which sheets 21 and 22 pass during the sealing process.

The conveyor 28 includes a rail support frame 29 and a carriage 30 adapted to ride on rails 31 mounted on the support frame. The carriage 30 which is adapted to move the spaced sheets 21 and 22 through the furnace, includes a substantially rectangular base 32 (Fig. 5) supported on axles 33 which carry grooved wheels 34 at their ends cut to substantially the curvature of the rails 31 so as to accurately guide the carriage as it moves adjacent the furnace.

Vacuum platens 35 and 36 are provided on the carriage to support the sheets 21 and 22 in substantially vertical and spaced position with respect to one another as the carriage moves the sheets through the furnace. More particularly, the vacuum platen 35 is mounted on one end of a stub shaft 37 which is rotatably mounted adjacent its other end in a bearing 38 on a cross arm 39. Cross arm 39 is supported by means of pillow blocks 40 between the ends of a pair of spaced support shafts 41 which are secured by means of additional pillow blocks not shown to the rectangular base 32. Vacuum platen 36 is mounted on one end of a longer shaft 42 and is spaced from platen 35 a distance equal to the width of the all-glass multiple sheet glazing unit to be produced. The shaft 42 is rotatably journaled in suitable bearing on the base 32 and may be turned by a handle or knob 43 for a purpose to be described hereinbelow.

As will best be seen in Fig. 4, each of the platens 35 and 36 is provided with depressions or vacuum cups 44 through which vacuum may be applied to the sheets to hold them against the faces of the respective platens. Grooves 45 are provided along the face of each of the platens which connect the vacuum cups 44 to a centrally disposed opening or bore 46 provided in both the stub shaft 37 and the longer shaft 42. A vacuum or negative pressure area is created in the vacuum cups 44 by means of a vacuum pump 47 (Fig. 5). The vacuum pump 47 is carried on the base portion 32 and is connected by a suitable pipe 48 to bore 46 in the stub shaft 37 and by pipe 49, which connects into pipe 48, to the bore in shaft 42.

As mentioned above, the carriage 30 rides on the rails 31 to carry the sheets 21 and 22 through the furnace. Movement of the carriage is accomplished by means of a chain drive mechanism 50 (Fig. 5) to which the carriage 30 may be operably connected by means of a suitable coupling 51.

Turning now specifically to the furnace 27 (Figs. 4 and 5), it is formed generally of a bottom wall 52, side walls 53 and 54 and a roof or ceiling 55 of fire brick or other suitable refractory material. The bottom wall 52 is supported on its corner edges by longitudinally extending beams 56 fastened to support legs 57. For purposes of illustration, heat is supplied to the furnace by nichrome or other wire filaments 58 fastened to the side walls 53 and 54, however, gas burners or other well known heating techniques may be employed to produce the desired heating effects.

To allow the support shafts 41 and the shaft 42 to extend into the interior of the furnace so that platens 35 and 36 may support sheets 21 and 22 and move them past the sealing stations A and B etc., the furnace 27 is provided with a slot (not shown) in the side wall 54, one side of which is defined by a longitudinally extending channel 59 (Fig. 5). This slot allows the platens 35 and 36 to be moved completley through the furnace and past each of the sealing stations A, B, etc., without meeting any obstructions.

At sealing station A there is provided a sealing element which includes a bending or fusion burner 60 (Figs. 4 and 5), a forming or shaping tool 61 and a finishing burner 62 all mounted on a suitable frame 63 which extends into the furnace. More particularly, the fusing burners 60 (Figs. 4 and 5) have angularly disposed side rows of nozzles 64 mounted thereon. The nozzles 64 serve to direct flames 65 in impinging relation upon the edge portions of the glass sheets 21 and 22 as they move therepast to heat the edge portions to the bending temperature thereof.

In station A for example, after a pair of aligned edge portions of the glass sheet are heated to at least the bending temperature of the glass by impinging flames 65 (Fig. 4) coming from the nozzles 64 they are moved into contact with the forming tool 61. The forming tool 61 includes forming wheels 66 rotatably mounted by substantially vertical axles 67. Each of the wheels preferably has a lower cylindrical ridge portion 68 of uniform circumference which may be moved substantially in contact with one another, while the upper portions of the forming wheels are tapered upwardly and inwardly from the ridge portion and have a dished-out or concave portion as indicated at 69. This dished-out or concave portion is formed to correspond to the desired curvature or shape of the sealed edge side wall 24 of the mutliple sheet glazing unit 20.

Thus, as the sheets leave the fusion burner area 60 where the edge portions thereof are heated to at least the bending temperature of the glass, they engage the forming wheels 66, which are driven through axles 67 at substantially the speed of movement of the sheets by a gear 70 and motor 71 (Fig. 4) and act to force or bring the edge portions of the respective sheets 21 and 22 into contact with one another. That is, the softened edge portions of the sheet upon passing through the restricted passageway between the forming wheels are caused to deflect inwardly to a point where they are brought into contact with one another and fused together.

If desired, after the side walls or edges of the all-glass unit have been bent to the desired configuration by the forming tool 61, the marks or scratches that may have been formed by the forming tool may be removed by a fire polishing process. For this purpose, there is provided a finishing or polishing burner 62 having two rows of aligned nozzles 72 which direct impinging flames 73 upon the sealed edge of the unit to again heat it thus causing the marks or scratches to blend in an even smooth contour.

After an edge wall 24 of the unit has been sealed for example, in sealing station A such as described above, the unit is rotated 90° as the carriage 30 moves it to sealing station B to place another pair of unsealed edges in position to be sealed. To rotate the glazing unit, the handle 43 on the end of shaft 42 is used to rotate platen 36. Since at this point the sheets 21 and 22 are joined along at least one edge thereof, and since both of the platens 35 and 36 exert vacuum forces upon the glazing unit, the far platen 35 may rotate in its bearing mount 38 with the glazing unit 20 as the platen 36 is rotated. After being rotated the sheets are moved to station B and past a heat source 74 having nozzles 75 which direct impinging flames 76 upon the marginal edge portions of the sheets to heat them to bending temperature.

As pointed out hereinabove, it has been common practice in the forming of multiple sheet glazing units to place the dehydration or breather holes through the face portions or surfaces of the glass sheets before they were sealed together. This of course was found to be disadvantageous in some instances because of large amounts of breakage which occurred in drilling the sheets, or because of small fissures or fractures which emanated from the drilled holes and caused the sheets to break because of heat shock in the sealing of the edge portions together.

Figure 6:
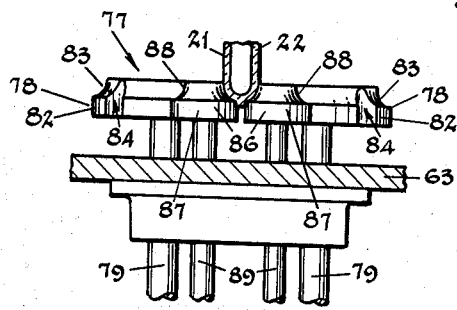
Fig. 6 is a side view of an edge forming tool for sealing the marginal edge portions of the sheets together while leaving an opening in a sealed edge portion thereof.
Figure 7:
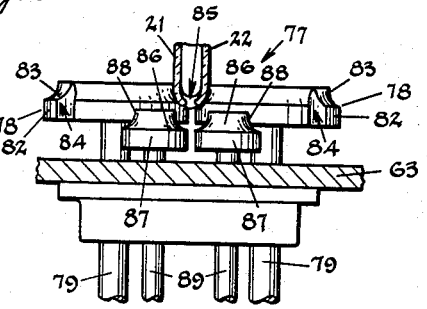
Fig. 7 is a side view of the edge forming tool shown in Fig. 6 illustrating the relationship between the forming tool as the opening is being formed in the edge wall of the unit as it is being sealed.

According to the present invention, to alleviate these conditions the dehydration or breather hole 25 (Fig. 2) is formed in an edge wall 24 of the unit as such edge wall is being formed. This is accomplished by means of a special forming tool 77 (Figs. 5, 6, and 7) which is illustrated here as being located at sealing station B immediately after the heat source 74. More particularly, as shown in Figs. 6 and 7, the special forming tool 77 comprises main forming rolls 78 rotatably mounted on axles 79 which axles are connected together by a gear 80 (Fig. 4) and driven by a motor 81. Each of the forming rolls has a lower cylindrical ridge portion 82 which may be moved substantially in contact with one another, and an upper tapered and dished-out portion 83 contoured to the desired shape of the side walls 24.

To form the dehydration hole or opening in the edge wall 24 as it is being formed there is provided in each of the forming rolls 78 a notch 84. These notches are synchronized with respect to one another by the gear 80 so that they are opposed to one another as they move in contact with the edges of the sheets 21 and 22 during the bending of the marginal edges of the sheets together. Consequently, when the respective notches 84 are moved into contact with the edges of the sheets, narrow areas of the sheets are not deflected into fusion contact with one another thus leaving a small opening as indicated at 85 in Figs. 7 and 8.

It will be evident therefore that as the edge wall 24 is formed, a plurality of periodic openings 85 will be formed in the edge wall. These periodic openings, except for specific predetermined openings, are subsequently sealed by smaller secondary forming wheels 86 (Figs. 6 and 7) which are included as part of the forming 77. The smaller secondary forming rolls 86 as shown in Figs. 6 and 7 have a ridge portion 87 and a dished-out portion 88 and are mounted on axles 89; these secondary forming wheels are urged into sealing position as shown in Fig. 6 by a suitable means such as a spring 90 as schematically shown in Fig. 10.

When it is desired to leave one of the openings in the side wall 24 as formed by the notches 84, the secondary forming wheels 86 are momentarily withdrawn from contact with the sheet as shown in Fig. 7 by a solenoid 91 (Figs. 4 and 10) to allow one of the openings 85 to pass, after which they are moved back into sealing position as shown in Fig. 6. By this means, any number of holes or openings may be formed in the edge wall to suit the intended purpose, after which the edge wall may be fire polished by a polishing burner 91' similar to burner 62 in station A.

Figure 8:
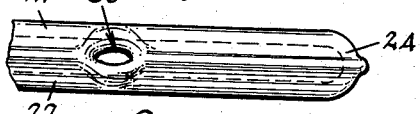
Fig. 8 is a fragmentary plan view of the sealed edge portion of a multiple sheet glazing unit made according to this invention showing the dehydration or breather hole before it is shaped.

If desired, after the opening 85 has been formed as shown in Fig. 8, it may be shaped to a desired configuration by a punch shaping tool 92 which is actuated in timed relation to the movement of the sheet. The punch tool comprises a rod 93 having a pointed end 94 which is adapted to penetrate the opening 85 and shape the opening to the configuration indicated by the numeral 25 in Fig. 2. A U-shaped collar 95 is provided in surrounding relation to the punch point 94 to engage the outer surface of the sealed edge wall 24 as the punch point is forced into the opening 85 to prevent the side walls of the sheets from bulging or deforming. The rod 93 is held in its normal inoperative position as shown in Fig. 10 by a spring 96 and is urged to its operative position shown in Fig. 10 by a solenoid 97 (Figs. 4 and 10). Movement of the punch is timed so as not to impede continuous movement of the unit through the sealing station and of course is withdrawn immediately by the spring 96.

Figure 10:
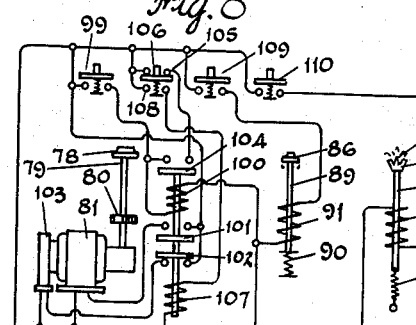
Fig. 10 is a schematic electrical diagram illustrating the sequential operation of the apparatus.

In reviewing now the operation and typical actuation of the hole forming means, reference is made to the schematic electrical diagram shown in Fig. 10. As the conveyor carriage moves the spaced glass sheets 21 and 22 from station A to station B an actuating arm 98 (Fig. 5) carried by the carriage 30 engages a normally open switch 99 which activates motor 81 to which the axles 79 are connected to cause the forming rolls 78 to rotate in synchronism through gear 80. More particularly, as the switch 99 is closed it energizes solenoid 100 which closes an interlock 101 closing the motor circuit and at the same time opens an interlock 102 deenergizing a brake 103 which normally holds the motor and forming rolls from movement and assures a quick stop of the rolls upon deenergization of the motor 81. Upon energization of the solenoid 100, a holding circuit is completed by an interlock 104 through a normally closed interlock 105 of a switch 106 to maintain the solenoid 100 in actuated position and maintain the motor operating.

As the conveyor cart moves onwardly, the arm 98 engages the switch 106 which breaks the motor holding circuit through the interlock 105 and energizes brake solenoid 107 through normally open interlock 108 of switch 106. Simultaneously, upon actuation of brake solenoid 107 the interlock 102 is closed actuating the brake so as to stop any further free-wheeling motion of the motor 81 and forming rolls 78.

As noted hereinabove, a plurality of periodic openings will be formed in the edge being sealed as the notches 84 engage the marginal edge portions of the sheets and these openings are subsequently sealed by the small forming rolls 86 until such forming rolls are moved out of contact with the sheet as illustrated in Fig. 7. For purposes of illustration, as shown in Fig. 10, the small forming rolls 86 are normally urged to sealing position by compression spring 90 which engages the axles 89. Solenoid 91 is provided to withdraw the secondary forming wheels 86 from sealing position and is actuated when normally open switch 109 is contacted by the arm 98 causing the forming wheels 86 to move to an inoperative position as shown in Fig. 7. It will be apparent that switch 109 may be located at various locations along the path of the arm 98 so that the location of the unsealed opening may be placed anywhere along the sealed edge wall 24, and also that the retraction of the forming rolls may be suitably timed such that they remain out of contact with the edge wall 24 for a specified travel of the sheets.

Figure 9:
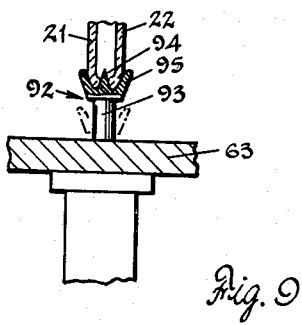
Fig. 9 is a fragmentary sectional view of the shaping means which may be used in shaping the dehydration hole after it has been formed.

After the small forming wheels 86 have been withdrawn allowing at least one of the openings 85 to remain unsealed, the arm 98 subsequently engages normally open switch 110 which activates a solenoid 98 to cause the hole shaping rod 93 to thrust upwardly at a predetermined instant to shape the opening 85 formed by the notches 84 to a desired contour such as indicated by numeral 25 in Fig. 2. This is a very fast actuation and the shaping rod 93 is immediately returned to an inoperative position as illustrated by the dotted lines in Fig. 9 by the spring 96 so as not to impede travel of the glazing unit through the furnace. Of course, it will be understood that the fusion burner 74 and the fire polishing burner 91' in sealing station B are the same as those discussed hereinbefore in connection with sealing station A and that only the forming tool 77 is changed to provide the spaced openings 85 in the sealed edge wall 24 by means of the notches 84.

It will be apparent that while only two sealing stations have been shown, that generally there will be as many sealing stations as there are sides of the unit to be sealed. For example, if the unit is rectangular, four sealing stations will be provided and the unit will be rotated after each of the respective edges has been sealed to successively place the remaining aligned unsealed edges of the sheets in position to be sealed. In this connection, it will be apparent that the special forming tool 77 may be placed at any of the sealing stations, depending on the number of dehydration or breather holes desired.

Reviewing now the entire process of this invention by which spaced sheets of glass may have dehydration or breather holes formed in the sealed edge portions during the sealing of the unit, initially the sheets of glass 21 and 22 are supported in position on the conveyor carriage 30 by means of platens 35 and 36. The conveyor carriage then moves the sheets through the respective sealing stations A, B, etc., in the furnace to fuse the edge portions together. As the sheets move through station A, a pair of aligned edge portions are heated to at least bending temperature by fusion burner 60, after which they are moved into engagement with the forming tool 61 to bring the edges into fusing contact with one another, and thence past the finishing burner 62 to remove any surface irregularities.

Before moving to the sealing area B, the sheets 21 and 22 are rotated to align the next edge to be sealed by means of crank handle 43 which rotates the shaft 42 and platens 36 and 35 to place another pair of aligned edges of the sheets in position to be sealed. As the unsealed pair of edges pass the fusion burner 74 in station B and are heated to at least the bending temperature thereof, they move into engagement with the forming tool 77 which brings the edges into fusing contact with one another except for the periodic openings 85 produced by the notches 84 in the main forming rolls 78. These periodic openings 85 except for a specific predetermined opening or openings, are subsequently sealed as the edge wall moves into contact with the secondary forming rolls or wheels 86.

When it is desired to leave one of the openings 85 as formed by the notches 84, the smaller forming wheels 86 are withdrawn from contact with the sheet as shown in Fig. 7 to allow one of the openings to pass, after which they are moved back into their sealing position as shown in Fig. 6. If desired, after the opening 85 has been formed as shown in Fig. 8, it may be shaped while in a semi-soft condition to a desired configuration by a hole shaping means 92 which is actuated in timed relation to the movement of the sheet. In this way, the dehydration hole or opening as illustrated in Fig. 2 and indicated by the numeral 25 may be formed, however, the opening 85 as shown in Fig. 8 may be sealed as such and it is not imperative that the opening be shaped by the hole shaping means.

As noted hereinabove, by forming the dehydration or breather holes in the sealed side wall of the glazing unit substantial advantages are obtained. For example, formation of the holes during the fabrication of the units eliminates the necessity and cost of drilling such holes in the glass sheets before they are sealed together. Moreover, losses in breakage caused by defectively drilled holes, or by breakage caused by thermal shock when the edges of the sheets are initially heated during the sealing process is eliminated. Additionally, the placing of the dehydration hole in the side or edge wall portions has the further advantage of placing the sealed hole in a position where it is less likely to be broken during installation or during subsequent cleaning of the unit.

It of course is to be understood that the form of the invention disclosed herein is to be taken as the preferred embodiment thereof, and that various changes in the shape, size adn arrangement of parts may be resorted to without departing from the spirit of the invention or the scope of the following claims.

We claim:

1. Apparatus for producing multiple sheet glazing units, comprising means for supporting a plurality of sheets in spaced face-to-face relation with respect to one another, means for heating the marginal edge portions of said sheets to a pliable condition, means for sealing portions of the heated marginal edge portions of the sheets together to form edge walls while leaving other portions of said marginal edge portions unsealed to form an opening in an edge wall, means for moving said sheet support means and sealing means relative to and past one another to effect sealing of said edge walls, shaping means provided so as to be in alignment with the sealed edge wall of the unit having unsealed portions therein and movable toward and away from said edge wall and into contact with said edge wall along an opening therein to shape a contour of the opening, means connected to the shaping means for moving said shaping means into engagement with said opening as said opening is opposite said shaping means, and means operably connected to said last named means for actuating the same in timed relationship to the relative movement of said sheet supporting means and said sealing means.

2. Apparatus for producing multiple sheet glazing units, comprising means for supporting a plurality of sheets in spaced face-to-face relation with respect to one another, means for heating the marginal edge portions of the sheets to a pliable condition, means for sealing portions of the marginal edge portions of the sheets together to form edge walls while leaving a plurality of openings in an edge wall, means mounted adjacent said sealing means for selectively closing openings in said edge wall, means for shaping the openings in said edge wall, and means for effecting relative movement between said sheet supporting means and sealing means to cause said sealing means to move into engagement with said sheets.

3. Apparatus as claimed in claim 2, in which said means for sealing selected openings in said edge walls includes a rotatable wheel mounted for movement into and out of engagement with said edge wall, and means are connected to said wheel for moving said wheel toward and away from the edge wall portions of said sheets as said relative movement is effected between said sheet supporting means and sealing means.

4. An apparatus for producing multiple sheet glazing units, comprising means for supporting a plurality of sheets in spaced face-to-face relation to one another with the space therebetween completely free from obstructions, means for moving the sheet supporting means and glass sheets along a definite path, means for heating marginal edge portions of the glass sheets to a temperature at which they can be fused to one another as said sheets move along said definite path, means disposed along the path of movement of the sheets for intercepting and urging portions of the heated marginal edges toward and into fusion contact with one another to form edge walls while leaving other portions thereof separated from one another to provide an opening in an edge wall, and shaping means for contouring said opening in the fused edge wall as said glass sheets move along said definite path.

References Cited in the file of this patent

UNITED STATES PATENTS

| | | |
|---|---|---|
| 1,179,155 | Bennett | Apr. 11, 1916 |
| 1,448,351 | Kirlin | Mar. 13, 1923 |
| 2,116,297 | Aurien | May 3, 1938 |
| 2,193,393 | Danner | Mar. 12, 1940 |
| 2,389,360 | Guyer et al. | Nov. 20, 1945 |
| 2,761,248 | Cowley et al. | Sept. 4, 1956 |